May 23, 1961     I. NEVIN ET AL     2,985,097
GAS BROILER WITH HEAT SHUTTER DEVICE
Filed April 15, 1958     6 Sheets-Sheet 1

INVENTORS.
IRA NEVIN
ARTHUR I. FADER
BY
ATTORNEY

May 23, 1961    I. NEVIN ET AL    2,985,097
GAS BROILER WITH HEAT SHUTTER DEVICE
Filed April 15, 1958    6 Sheets-Sheet 2

INVENTORS.
IRA NEVIN
ARTHUR I. FADER
BY
ATTORNEY

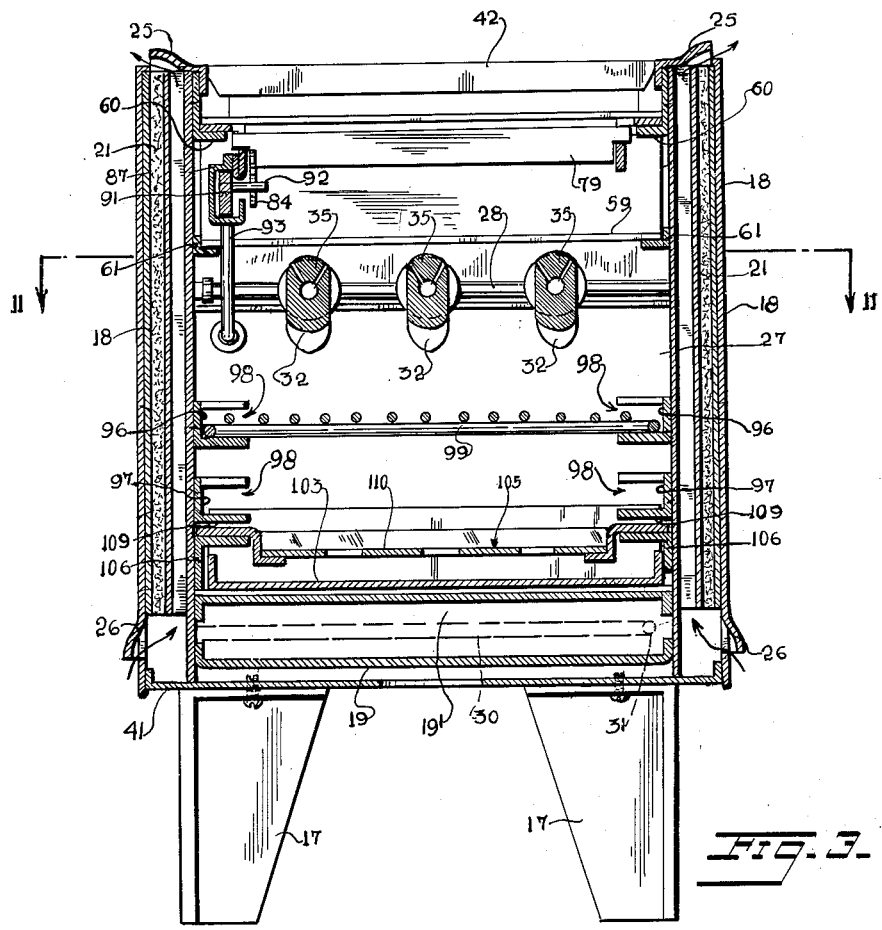

INVENTORS.
IRA NEVIN
ARTHUR I. FADER
BY
*Zoltan H. Holacsek*
ATTORNEY

May 23, 1961  I. NEVIN ET AL  2,985,097
GAS BROILER WITH HEAT SHUTTER DEVICE
Filed April 15, 1958  6 Sheets-Sheet 5
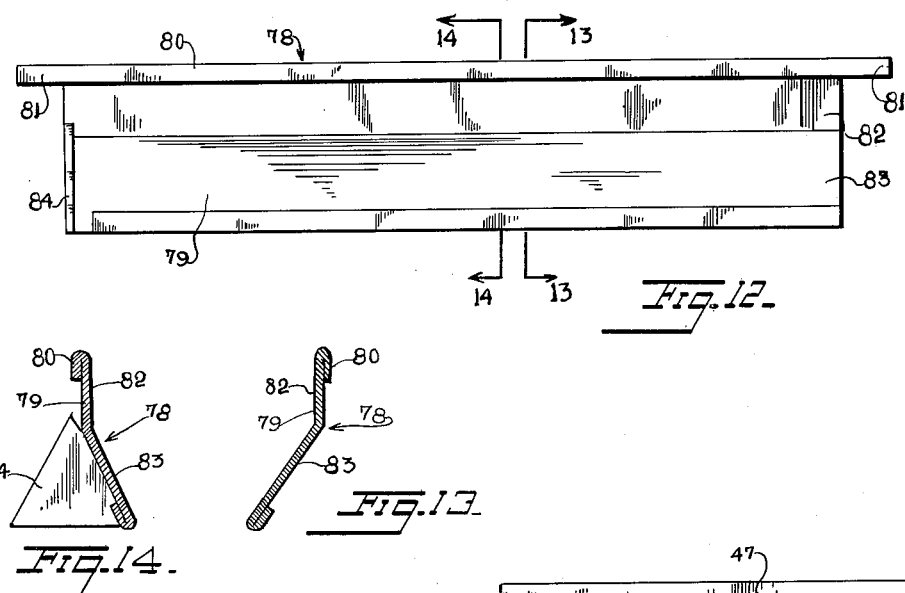
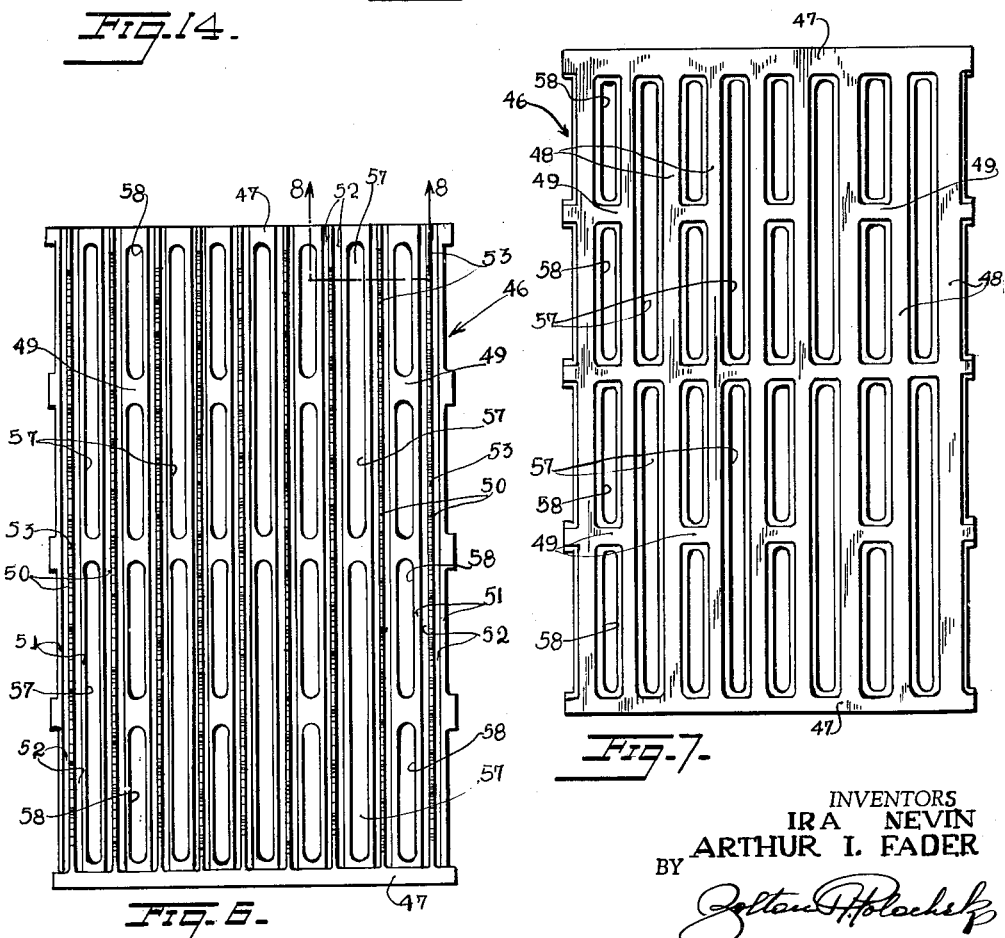
INVENTORS
IRA NEVIN
ARTHUR I. FADER
BY
ATTORNEY

INVENTORS.
IRA NEVIN
ARTHUR I. FADER
BY
ATTORNEY

United States Patent Office 2,985,097
Patented May 23, 1961

2,985,097
GAS BROILER WITH HEAT SHUTTER DEVICE
Ira Nevin, 1055 Duncan St., Bronx, N.Y., and Arthur I. Fader, 460 Tuckahoe Road, Yonkers, N.Y.
Filed Apr. 15, 1958, Ser. No. 735,655
1 Claim. (Cl. 99—447)

This invention relates to cooking equipment and, more particularly, to new and useful improvements in a gas broiler for the cooking of meats and other food products on exposed and concealed grilles or grates.

A principal object of the present invention is to provide in a gas broiler an arrangement of grates and burners for using gaseous fuel in broiling meats, toasting, heating food and like operations by placing the meat and the like to be broiled over the burners and by placing the food to be toasted or otherwise cooked or heated under the burners thereby utilizing the products of combustion from the burners to the maximum extent.

Another object of the invention is to arrange the gas burners closely spaced below the grates supporting the meat to be broiled so as to create a flame near or in direct proximity to the grate so that the meat may be exposed to both the normal convectional heating from the gas burners and also a flame created by the heat developed by the gas burners. In other words, the invention contemplates the provision of means whereby grease drippings from the meat are intercepted and retained in such proximity to the burners as to cause the grease to be heated to its flash temperature and thereby caused to flame upwardly against the grate thereby subjecting the meat on the grate to direct flame as well as convectional heat temperatures to produce a charcoal type flavor and taste.

A further important object of the present invention is to provide a gas broiler with movable louvres or dampers interposed between the gas burners and grates thereabove so that the heat reaching the grates from the gas burners may be readily controlled.

Another object of the invention is to provide a gas broiler with a grate that supports the meat with a minimum contact of the meat on the grate thereby reducing the grilling or frying of the meat to a minimum and thereby maintaining hot air contact with the meat at a maximum.

A further object of the invention is to provide a gas broiler with a grate that supports the meat and guides the flow of grease therefrom to the drip pan.

A further object of the invention is to provide a gas broiler of this character with a flame guard whereby flaming grease or oil is prevented from reaching the drip pan.

Still another object of the invention is to provide a gas broiler adapted to broil and cook food products above and below the gas burners with an economical use of fuel.

It is also proposed to provide a gas broiler of this character that is simple and rugged in construction, economical to manufacture and highly efficient in operation.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

Fig. 3 is a cross-sectional view taken on the plane of the line 3—3 of Fig. 1.

Fig. 6 is an enlarged top plan view of a grate unit.

Fig. 7 is a bottom plan view thereof on the same scale as Fig. 1.

Fig. 12 is a side elevational view of a louvre plate.

Fig. 13 is a sectional view taken on the plane of the line 11—11 of Fig. 12.

Fig. 14 is a sectional view taken on the plane of the line 12—12 of Fig. 12.

Fig. 15 is a perspective view of the grease guard tray.

Figure 1:
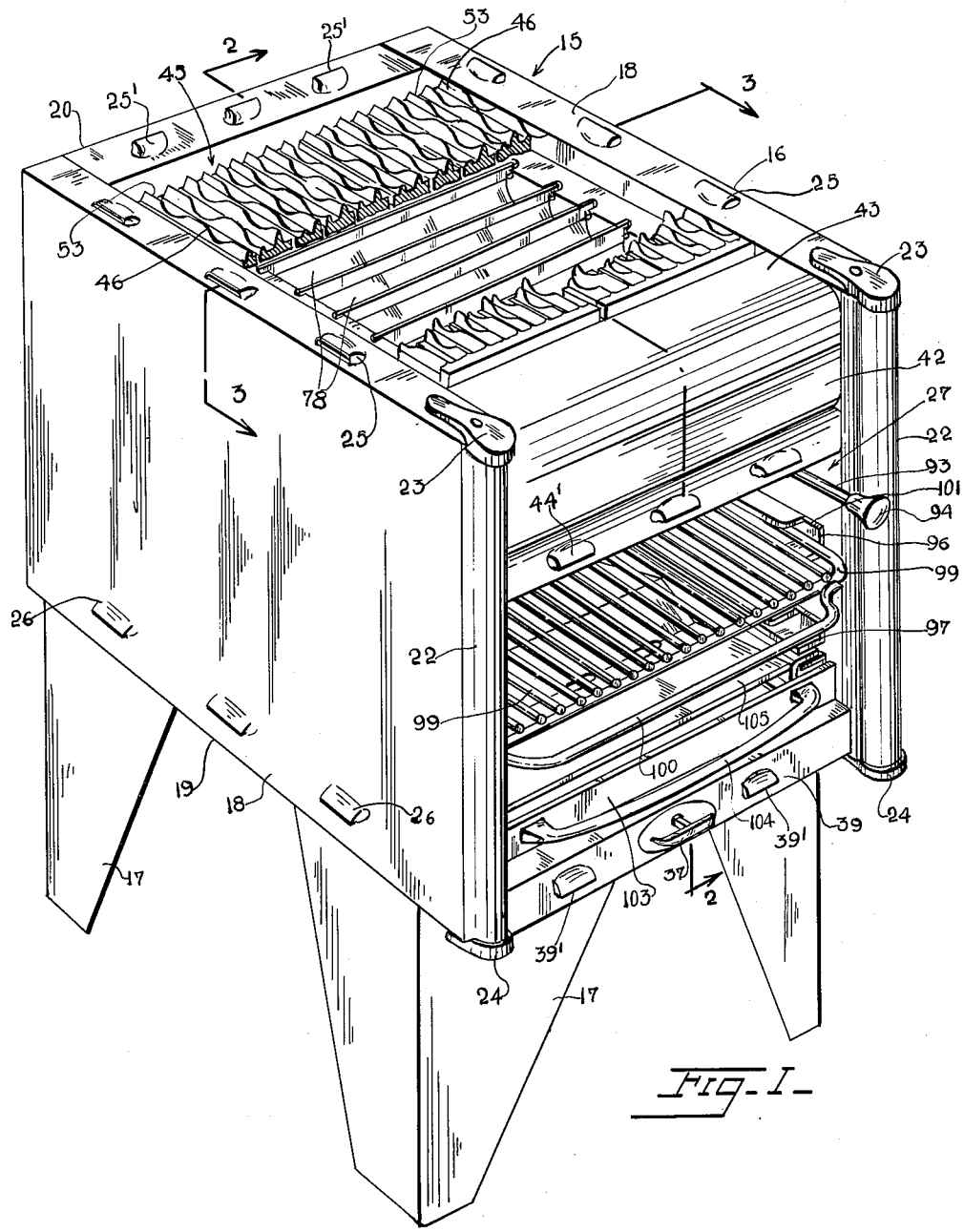
Fig. 1 is a front perspective view of a gas broiler embodying our invention, parts being broken away.
Figure 2:
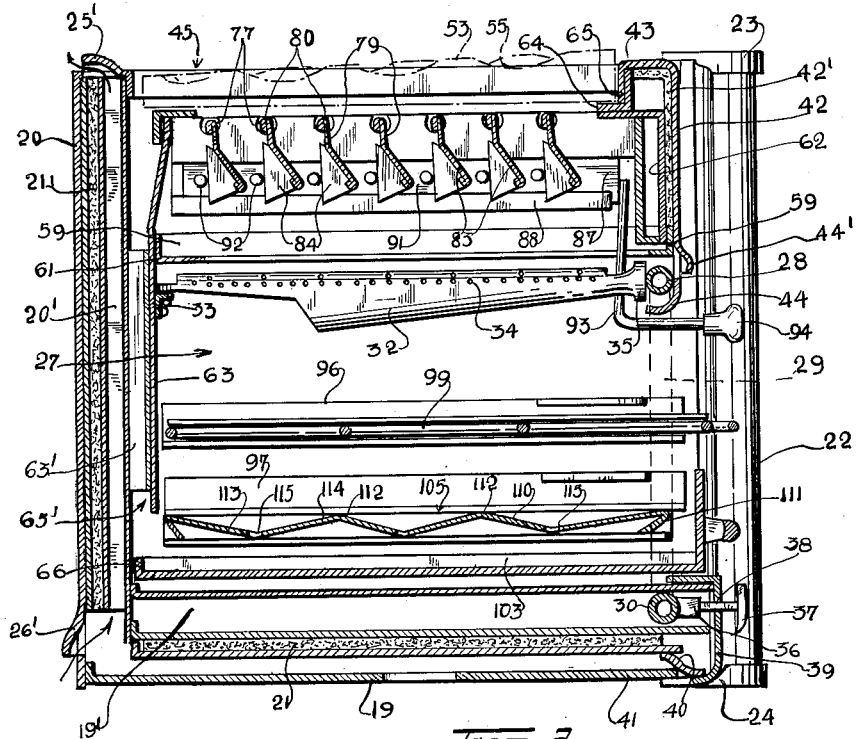
Fig. 2 is a vertical sectional view taken on the plane of the line 2—2 of Fig. 1.

Referring in detail to the drawings, in Fig. 1 a gas broiler made in accordance with the present invention is designated generally by the numeral 15. This broiler comprises a rectangular-shaped metal casing or housing 16 supported on corner metal legs 17 of angular configuration. The casing includes hollow side walls 18, 18, a hollow bottom wall 19 and a hollow rear wall 20, being open at the front and top. The front ends of the side walls 18, 18 are finished off with upright tubular members 22, 22 closed at the top and bottom by removable closure caps 23 and 24, respectively. The hollow side, rear and bottom walls define a hollow broiler compartment 27.

Adjacent the top of the compartment 27, the burner construction is mounted. This construction includes a horizontally disposed pipe 28 extending across the open front of the housing and connected at one end to a vertically disposed pipe 29 extending downwardly through one wall 18. One end of the pipe 29 is connected to another horizontally disposed pipe 30 extending across the front of the housing at the bottom thereof and through the other side wall 18 to an inlet 31 at the rear connected to a source of gas supply. A number of spaced tubular members 32, have one end connected to the pipe 28 and the other end closed and supported on an angle bar constituting a ledge 33, extending across and secured to the rear of the compartment. The tubular members are horizontally disposed and formed with a series of perforations 34 for the greater part of their lengths along both sides thereof and extending radially through the walls of the tubular members at angles suitable to direct the flames upward. While three tubular members 32 are shown, it will be understood that any number desired may be used.

The connections between the tubular members and the pipe 28 include air mixers 35. The lower pipe 30 is equipped with a valve 36 actuated by a handle 37 extending through an opening 38 in a movable closure plate 39 supported on a spring 40 secured at one end to the bottom surface of a supporting plate 41 secured to the housing spaced below hollow bottom wall 19.

The front of the burner construction is covered by a removable closure plate 42 having an inwardly directed flange 43 and a curved flange 44 on the bottom adapted to be hooked around and interlocked with the pipe 28.

The plate is lined with insulating material 42' and may be provided with air vents 44'.

The interior of each side wall 18 is divided by partitions 16' into spaced inner flues 18' extending from the top to the bottom of the side wall and is provided at the top and bottom with air vents 25 and 26, respectively. A solid layer of asbestos material 21 inside the side wall and outwardly of the air flues protects each side wall.

The interior of the hollow rear wall 20 is similarly divided and formed with spaced inner flues 20' extending from the top to the bottom thereof, and is provided at the top and bottom with air vents 25' and 26', respectively. A solid layer of asbestos material 21' inside the rear wall and outwardly of the air flues protects the rear wall.

The interior of the bottom wall 19 is similarly divided and formed into spaced inner air flues 19' extending from the front to the rear thereof. Air vents 39' in the movable closure plate 39 communicate with the outer ends of the flues 19'. A solid layer of asbestos material 21' lines the bottom wall outside of the flues 19'.

Figure 9:
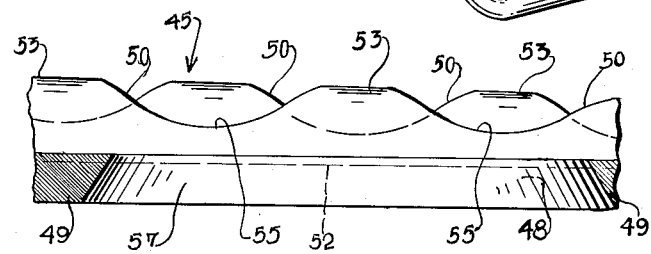
Fig. 9 is an enlarged side elevational view of a fragment of the grate unit of Fig. 6.
Figure 8:
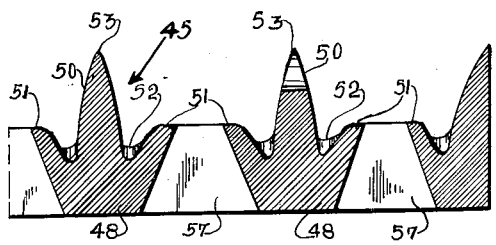
Fig. 8 is a cross-sectional view taken on the plane of the line 8—8 of Fig. 6.
Figure 11:
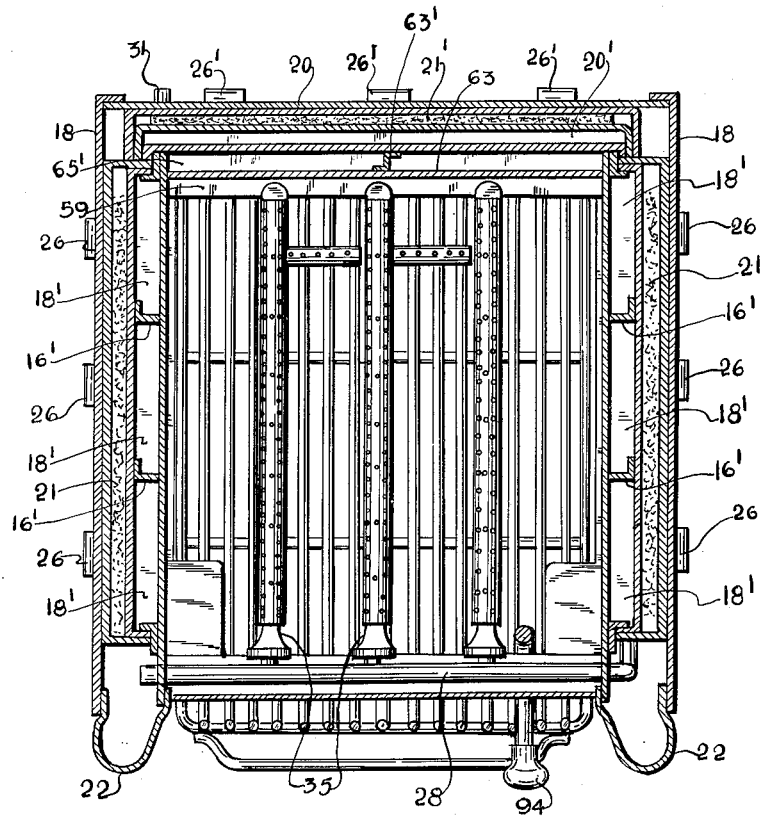
Fig. 11 is a sectional view taken on the plane of the line 11—11 of Fig. 3.
Figure 10:
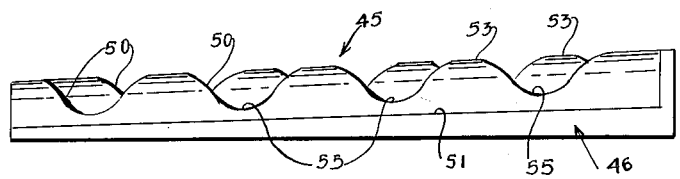
Fig. 10 is a side view of the grate section.

The grate or grid construction for supporting the meat and the like to be cooked is designated generally by the numeral 45 and is supported in the compartment above the burner construction. This grate construction is made of cast iron and is rectangular in shape, preferably sectional, including two rectangular grate units or sections 46, 46. Each grate unit consists of a rectangular frame including crosspieces 47 at the ends thereof. The crosspieces connect the ends of a plurality of elongated closely spaced flat bars 48 connected at spaced intervals by bridge portions 49. The outermost bars 48 constitute the sides of the frame. Each bar 48 tapers slightly from its top downwardly, terminating in a flat narrow bottom edge. The wider top surface of each bar is formed with a deep central rib 50 extending upwardly therefrom and with shallow ribs 51, 51 along the long edges of the bar. These ribs define grooves 52, 52 between the central and edge ribs. The central rib 50 tapers slightly upwardly from its base thereby providing a narrow top knife edge 53 providing a straight bearing surface. The central rib 50 is also cut away at spaced intervals forming recesses 55 which, with the narrow top edge 53, reduces the bearing surface of the rib to a minimum. The recesses have curved edges 56 merging gracefully into the straight knife edges 53 of the rib. The recesses 55 in adjacent ribs are staggered so that looking transversely across the grate narrow flat portions 53 in one rib alternate with recesses 55 in the adjacent ribs, as seen in Fig. 9.

The bridge portions 49 are so arranged that between successive adjacent ribs are alternately two long slots 57 and then four short slots 58. One end crosspiece 47 extends to the top of the central ribs 50.

This type of grate construction provides a wavy tapered surface to permit minimum contact of metal with the meat and thus reduces grilling or frying of the meat to a minimum and furthermore maintains hot air contact with the meat at a maximum. The grate bars taper from front to back and the grooves permit the grease to flow by gravity to the interrupted portions of the central rib 50, and to escape from the grate bar over the thinner end of the grate unit.

The grate or grid construction 45 is removably mounted on a subframe structure formed in the compartment 27 above the burner tubes 32. This structure consists of a pair of top and bottom angle frame bars constituting ledges 60 and 61, respectively, in opposed relation, on the inner side of each side wall 18 of the casing. Angle frame bars 59 extend across the ends of the bottom ledges 61. A hollow wall 62 is supported on the front end of the ledges and a solid wall 63 is supported on the angle frame bar 59 at the rear and is secured to an angular bracket 63' fastened to rear wall 20. An angle bar constituting a ledge 64 is secured to an extension on the inner top edge of the front wall 62 with one portion 65 thereof extending upwardly and serving as a seat for the flange 43 of the closure plate 42. The grid units 46, 46 are supported at their front end on the horizontal portion of the angle bar 64 and at their rear end on the top edge of the rear wall 63. The grate units when so mounted have their top edges flush with the top surface of the side and rear walls of the casing. Rear wall 63 is spaced forwardly of the inner surfaces of rear wall 20 and terminates short of the bottom wall 19 thereby providing a rear passage or drain 65' between said rear walls.

The frame 70 is supported on the top ledges 60 with the horizontal portions of the side plates 72, 72 resting on the horizontal portions of said ledges 60, the front plate 73 of the frame resting on the horizontal portion of ledge 64, and the rear plate 74 resting on the top edge of rear wall 63. The cut away portions 69 of the frame 70 permits the front plate to be positioned over the ledge 64.

At spaced intervals along the corners 75 of the side plates 72, 72, there are formed keyhole slots 76 intersecting the angular portions of the plates, the larger circular portion 77 of the slots being formed in the vertically disposed portion of the side plate. The slots 76 in the side plates 72, 72 are oppositely disposed and pivotally mounted in said slots are a number of louvres 78.

Each louvre 78 comprises an elongated rectangular-shaped metal plate 79. One long edge of each plate 79 is turned upon itself as indicated at 80 and extended laterally of the plate thereby forming trunnions 81. The body of the plate is bent longitudinally intermediate its top and bottom thereby providing angularly disposed portions 82 and 83. At one end, the angularly disposed portion 83 is bent at right angles to the plane of the body thereby forming a laterally extending wing portion 84, inwardly of the adjacent trunnion 81. The wing portion is triangular-shaped with its base along the portion 83 of the plate.

The louvres 78 are supported by the side plates 72, 72 of the frame 70 by inserting the trunnions 81 into the narrow portions of the slots 76 and seating said trunnions loosely on the lower edge of the wider circular portions 77 of the slots whereby the louvres normally hang downwardly with the portions 82 disposed in a vertical plane and the portions 83 thereof disposed at a slight angle to the vertical. The louvres are so supported that the wing portions 84 all extend in a rearward direction as viewed in Fig. 1, and in alignment with each other.

Figure 4:
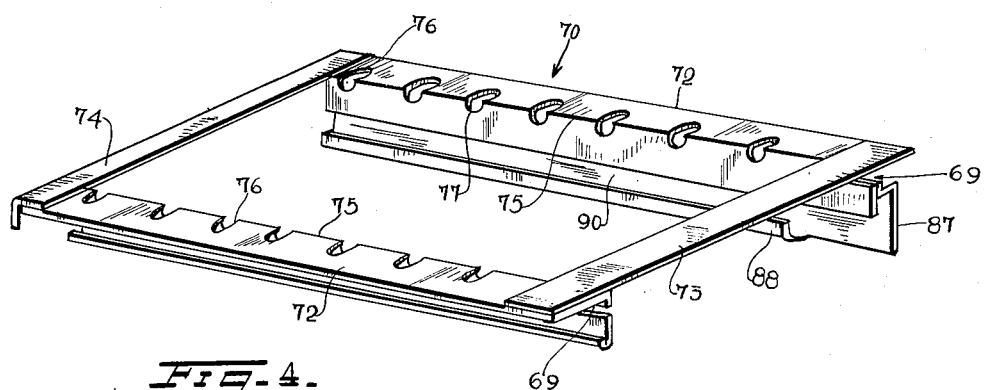
Fig. 4 is a perspective view of the louvre supporting frame.
Figure 5:
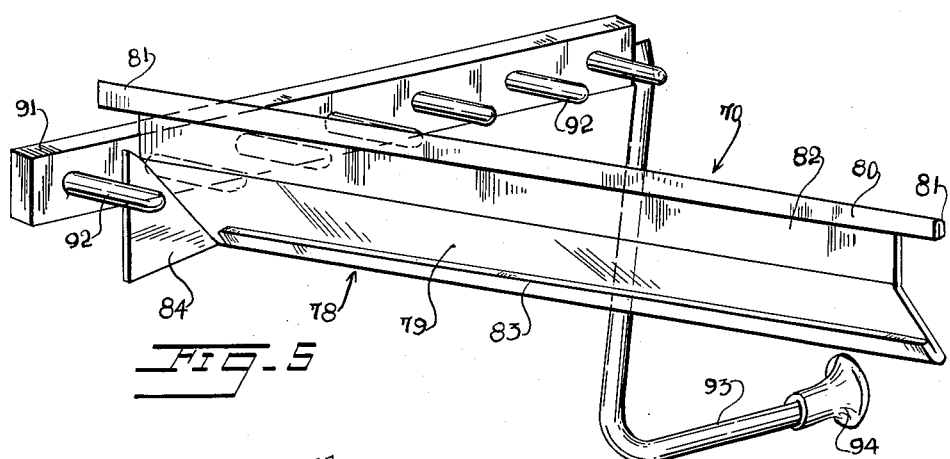
Fig. 5 is an enlarged, fragmentary, partly perspective and partly diagrammatic view of the louvre mounting and the louvre actuating means.

Louvres 78 are arranged and supported for swinging movement in unison whereby the compartment 27 above the louvres may be shut off from the upward passage or draft of air through the compartment. For the purpose of actuating the louvres in unison, a channel-shaped plate 87 is secured to one of the side plates 72 of the frame 71, the right-hand side plate 72 as shown in Fig. 4, by soldering or welding or the like. Channel plate 87 depends downwardly and along the plate 72 and forms an extension thereof. The flange 88 on the lower end of plate 87 is disposed in the same vertical plane with the vertical portion of the side plate 72 and is spaced therefrom forming an elongated slot 90 between the plates 87 and 72, which slot is open at both ends. An elongated narrow flat bar 91 slides in the slot 90 and carried by said bar at spaced intervals therealong are a series of pins 92 extending through and outwardly of the slot. The wing portions 84 of the louvres are disposed in the path of movement of the pins when the slide is actuated. A handle 93 is secured at one end to the outer end of the sliding bar for actuating the same, the other end of the handle extending outwardly of the casing and having a knob 94 thereon.

The louvres and slide are so disposed that outward movement of the handle causes the wing portions 84 of the louvres to be engaged by the pins and the louvre plates moved to horizontal closing position, with the free edges of the plates engaging beneath the long edge of the turned over portion 80 of the adjacent louvre plate thereby sealing the joint between the adjacent plates and preventing the passage of air to the grate units 46 and at the same time providing a surface for collecting grease drippings from the meat on the grate units. The angular shape of the body of the louvre plate permits this sealing operation.

Inward movement of the handle 93 will, of course, tilt the louvre plates 79 from the horizontal to any of different positions of angularity as desired in order to adjust the flow of air to the burners and grate.

According to the invention, provision is also made for supporting meat or other food products to be broiled, heated or toasted below the burner tubes whereby said meat or food products may be cooked, heated or toasted simultaneously with the cooking of the meat or other products on the grate 45. Below the burner tubes 32 in the broiler compartment 27, on each side of the side walls 18, 18, there are spaced pairs of upper and lower ledges 96 and 97, respectively, secured to the side walls in opposed relation. The ledges are U-shaped in cross section with the bight portions thereof secured to the side walls and the upper and lower leg portions thereof disposed horizontally providing elongated slots 98 opening inwardly of the broiler and being open at both ends.

A rectangular-shaped grille or tray 99 having a handle 100 on one end thereof, for supporting meat and the like thereon is slidably and removably supported in a selected pair of said ledges. The upper leg portion of each pair of ledges is cut away at its outer end as indicated at 101 to facilitate entry of the grille or tray into the slot.

A slidable drip pan 103 is removably and slidably mounted on the top surface of bottom wall 19 of the housing and is provided with a handle 104 on one end thereof to facilitate manipulation thereof.

The invention also contemplates the use of a grease guard tray 105 for collecting grease drippings from the grate 45 and grille 99. This tray is slidably and removably supported on opposed angle plates 106 secured to the side walls 18, 18 of the broiler with their horizontal leg portions closely spaced from the horizontal lower leg portions of the lower pair of ledges 97 thereby providing opposed elongated slots 109 for slidably receiving the tray. The tray comprises a solid metal plate-like rectangular-shaped body 110 with its end edges 111 inwardly turned. At spaced intervals, the body 110 is formed with transverse bends or creases 112 defining opposed slanting portions 113 and 114 on both sides of the crease or bend. Each slanting portion 113 slants in one direction toward one end of the body and each slanting portion 114 slants in a direction toward the other end of the body. Slanting portions are thus formed slanting toward both ends of the plate body.

Elongated slots 115 are formed in the body of the plate along the creases 112 so that grease sliding off of the slanting portions will flow to and through the slots 115 to the drip pan 103 therebelow. An elongated angular plate 116 is secured to each long edge of the plate body 110 by soldering, welding or the like and each plate 116 is formed with an outwardly and laterally extending flange 117 and an inwardly and laterally extending flange 118. Flange 118 extends over the ends of the inturned end edges 111 of the body and is soldered or welded to the outwardly bulged creases 112 of the plate body. In mounting the tray, the outwardly extending flanges 117 are inserted into the outer ends of the slots 109 between ledges 106 and 97 and the tray pushed inwardly to position over the drip pan 103.

In using the gas broiler, because of the novel construction of grate units 46, very little area of the supporting ribs 50 contact the supported meat. When it is desired to cook by convection from the burners 32, the louvre plates 79 are moved to open position so that the air is sucked up through the oven compartment 27 in chimney-like effect and escapes over the grate construction 45, thus providing maximum air circulation, permitting maximum cooling of the grate surface. Any grease droppings from the cooking meat or other food products on the grate construction 45 or grille 99 will fall through the slots in said grate or grille and downwardly onto the tray 105. Furthermore, grease will flow along the grooves 52 of the grid unit 46 and over the rear ends thereof and drop downwardly through the passage or drain 65 onto the drip pan 103 at the bottom of the housing. Any flaming oil from said droppings when it strikes the tray 105 will become extinguished before the droppings drain through the slots 115 in the tray and fall into the drip pan 103 below, thus preventing the fat in the drip pan from catching fire.

In order to create maximum flame and heat through and above the grate construction 45, the louvre plates 79 are swung upwardly to horizontal sealing position by pulling out the handle 93. The louvre plates will thus prevent air circulation and intercept the grease drippings falling from the grate throughout the projected grid area occupied by the louvre plates. The grease-collecting surface of the louvre plates thus is brought into such close proximity of the burner tubes 32 that the grease is heated to its flash temperature and thus ignited to burn in a flame rising up through the grate units 46. At such times, as it may be desired to produce a less intense flame, or to drop the flame location downwardly within the broiler compartment, the louvre plates may be inclined to produce the dual effects of lowered elevation and flame reduction due to some run-off of the grease.

It has been found in practice that when the louvre plates 79 are in open position, the broiling grates are cooled, thus controlling the amount of heat and flame in contact with the meat on the grates. When the louvre plates are closed, just enough heat passes through the louvre plates to make the grates hotter causing more flaming and faster operation because much of the heat is channeled upwards and the closed louvre plates prevent a chimney effect through the broiler from the bottom and thus prevent the flow of cooling air through the broiler.

The presence of the louvre plates also results in a saving of gas. This is so because flaming of the meat starts much sooner and faster because of the fat and grease drippings on the surface of the hot louvre plates when closed. Since the louvre plates get very hot due to the gas burners underneath, the fat vaporizes immediately on contact with the surface of the hot louvre plates and bounces directly back onto the meat in the form of smoke and flame. If the louvre plates are open, the process takes much longer and requires much more gas power since most of the fat falls onto the flare guard tray 105 at the bottom of the compartment 27 so that it cannot flare back to the meat as readily. By opening the louvre plates during the cooking operation, the chimney effect produced by a draft coming through the front of the broiler and up through the compartment to and through the grates causes a great deal of air to mix with the flame and smoke and thereby reduces the intensity of the flame and makes the flame much smaller.

When the metal wire grille 99 is used and mounted under the gas burners, the grille can be used to do regular commercial salamander type broiling, toasting, braising and pan broiling of any kind of food, and this operation taking place simultaneously with the broiling on the top grates uses no additional gas power.

Passage of air throughout the gas broiler may also be controlled by closing the front of the casing, by equipping the front of the casing with a hinged door or by equipping the front of the casing with a slidable drawer.

While we have illustrated and described the preferred embodiment of our invention, it is to be understood that we do not limit ourselves to the precise construction herein disclosed and that various changes and modifications may be made within the scope of the invention as defined in the appended claim.

Having thus described our invention, what we claim as new, and desire to secure by United States Letters Patent is:

In a gas broiler in combination, a casing having side, rear and bottom walls defining in said casing a broiler compartment with open front, burners adjacent the top of the casing, a grate construction supported on the casing above the burners, and adjustable heat shutter means disposed between the burners and grate construction for diverting heat from the burners to the grate construction, said heat shutter means comprising a frame structure supported on the side walls of the casing, said frame structure including a pair of spaced parallel angle bars each having a series of keyhole slots extending therealong, a plurality of louvers, each louver being formed by a plate with extended ends defining trunnions pivotally and removably supported in opposed slots of said angle bars, said plate having a generally triangular wing member extending perpendicular thereto near one end of the plate, the wing members being disposed in coplanar disposition near one of the angle bars, said one angle bar carrying a channel-shaped plate depending therefrom, a flat bar slidably disposed in said channel, a series of spaced pins mounted on said flat bar and extending outwardly of the bar and of said channel, the lengths of said pins exceeding spacing of the wing members from said one angle bar, one edge of each wing member contacting one edge of each of the pins respectively, and a handle joined to one end of said flat bar, said handle having a portion extending outwardly of the open front of said casing, whereby movement of said portion of the handle slides the flat bar so that the pins angularly turn all of the louvers simultaneously to a selected angular position with respect to said grate construction and the pins hold the louvers in said selected position.

References Cited in the file of this patent

UNITED STATES PATENTS

| | | |
|---|---|---|
| 156,797 | Jones | Nov. 10, 1874 |
| 262,929 | Childs | Aug. 22, 1882 |
| 279,111 | Vandernoort | June 5, 1883 |
| 411,670 | McCaughey | Sept. 24, 1889 |
| 1,263,331 | Lindroth | Apr. 16, 1916 |
| 1,504,102 | Davis | Aug. 5, 1924 |
| 1,563,823 | Anderson | Dec. 1, 1925 |
| 1,698,933 | Chartier | Jan. 15, 1929 |
| 1,956,387 | Hartman | Apr. 24, 1934 |
| 2,060,004 | Ebberts | Nov. 10, 1936 |
| 2,108,713 | Hillman | Feb. 15, 1938 |
| 2,746,378 | Lang | May 22, 1956 |
| 2,790,434 | Del Francia | Apr. 30, 1957 |
| 2,812,706 | Del Francia et al. | Nov. 12, 1957 |